United States Patent [19]

Klein et al.

[11] 4,294,715

[45] Oct. 13, 1981

[54] IMPREGNATING AGENT AND ITS USE

[75] Inventors: Alfons Klein, Duesseldorf; Rudolf Kron, Leverkusen; Karlfried Wedemeyer, Cologne; Ernst Knust; Lothar Havenith, both of Leverkusen, all of Fed. Rep. of Germany

[73] Assignee: Bayer Aktiengesellschaft, Leverkusen, Fed. Rep. of Germany

[21] Appl. No.: 83,876

[22] Filed: Oct. 11, 1979

[30] Foreign Application Priority Data

Jul. 2, 1979 [DE] Fed. Rep. of Germany ....... 2926609

[51] Int. Cl.$^3$ .......................... H01B 3/18; H01B 3/40
[52] U.S. Cl. .................................. 361/318; 252/578; 361/315
[58] Field of Search .................. 252/63; 361/315, 319

[56] References Cited

U.S. PATENT DOCUMENTS 4,054,937 10/1977 Mandelcorn et al. ............ 252/64 X

FOREIGN PATENT DOCUMENTS

| | | |
|---|---|---|
| 2700569 | 7/1978 | Fed. Rep. of Germany ........ 252/64 |
| 2934103 | 3/1980 | Fed. Rep. of Germany ........ 252/63 |
| 2395876 | 1/1979 | France ................................ 252/63 |
| 49-80045 | 8/1974 | Japan ................................. 252/63 |
| 49-109856 | 10/1974 | Japan ................................. 252/63 |
| 50-86700 | 7/1975 | Japan ................................. 252/63 |
| 1490581 | 11/1977 | United Kingdom ................. 252/64 |

*Primary Examiner*—Mayer Weinblatt
*Attorney, Agent, or Firm*—Sprung, Felfe, Horn, Lynch & Kramer

[57] ABSTRACT

A dielectric composition comprising a mixture of monoisopropylated diphenyls and polyisopropylated diphenyls, especially a mixture of 30 to 60 parts by weight of monoisopropylated diphenyls and 70 to 40 parts by weight of polyisopropylated diphenyls, the polyisopropylated diphenyls preferably being made up in turn of 60 to 85 parts by weight of diisopropylated diphenyls, 10 to 35 parts by weight of triisopropylated diphenyls and 0.5 to 5 parts by weight of tetraisopropylated diphenyls, these latter amounts being based upon the total amount of the polyisopropylated diphenyls.

5 Claims, No Drawings

IMPREGNATING AGENT AND ITS USE

The invention relates to compositions which have advantageous dielectric properties and which can be used as impregnating agents in electrical installations.

Capacitors which contain 80 to 99% by weight of monoalkylated diphenyls and 20 to 1% by weight of dialkylated diphenyls have been disclosed in German Offenlegungsschrift No. 2,718,905. For the same application, German Offenlegungsschrift No. 2,823,758 discloses that the monoalkylated diphenyl contains at least 55% by weight of the meta isomer. The dielectric liquids described in the two Offenlegungsschrifts preferably contain proportions of an antioxidant and of a hydrogen acceptor.

It is also known, in the case of dielectrics based on phthalic acid esters, to use epoxides as stabilizers and hydroxyquinones as oxidation inhibitors (German Offenlegungsschrift No. 2,446,422 and German Auslegeschrift No. 2,700,569).

SUMMARY OF INVENTION

New compositions which have dielectric properties and are based on isopropylated diphenyls have been found which contain 30 to 60 parts by weight of mono-isopropylated diphenyls and 70 to 40 parts by weight of poly-isopropylated diphenyls.

The poly-isopropylated diphenyls in the compositions according to the invention preferably contain essentially di-, tri- and tetra-isopropylated diphenyls.

In particularly preferred compositions, according to the invention, which have dielectric properties, the poly-isopropylated diphenyls contain 60 to 85 parts by weight of di-isopropylated diphenyls, 10 to 35 parts by weight of tri-isopropylated diphenyls and 0.5 to 5 parts by weight of tetra-isopropylated diphenyls, based on the total amount of the poly-isopropylated diphenyls.

The isopropylated diphenyls in the compositions according to the invention can be present in the form of the possible isomers. For example, the mono-isopropylated diphenyl can be present essentially in the form of the meta- and para-isomers, the di-isopropylated diphenyl can be present in the form of the para/para'-, meta/meta'-, para/meta'- and para/meta-isomers, and tri-isopropylated diphenyl can be present in the form of the para/meta/meta'- and para/meta/-para'-isomers and the tetra-isopropylated diphenyl can be present in the form of the para,meta/para', meta'-isomer.

The mixtures of the isopropylated diphenyls according to the invention are in themselves known and can be prepared by known processes, for example by reacting diphenyl with propylene in the presence of Friedel-Crafts catalysts (Hyska, K.; Chem. Prům. 46, 264–270 (1971)).

Dielectric compositions of this invention can contain other components in addition to the isopropylated diphenyls, such as epoxide stabilizers, e.g. 2,2-Bis-(4-hydroxy-phenyl)-propane glycidyl ether and oxidation inhibitors.

2,2-Bis-(4-hydroxy-phenyl)-propane diglycidyl ether is known and can be prepared by reacting 2,2-bis-(4-hydroxyphenyl)-propane with epichlorohydrin (German Auslegeschrift No. 2,700,569).

Oxidation inhibitors are preferably aromatic carbocyclic compounds containing two hydroxyl groups. Examples which may be mentioned are di-tert.-amyl-hydroquinone, 2,2-bis-(4-hydroxyphenyl)-propane and 4,4'-butylidene-bis-(6-tert.-butyl-m-cresol). Di-tert.-amyl-hydroquinone is preferred.

The compositions according to the invention contain 90 to 110 parts by weight and preferably 95 to 100 parts by weight of the isopropylated diphenyls, 0.05 to 2.0 parts by weight and preferably 0.1 to 1.0 part by weight of the epoxide and 0.05 to 2.0 parts by weight and preferably 0.1 to 1.0 part by weight of the hydroquinone.

The invention also relates to the use of the composition according to the invention as a dielectric, especially as an impregnating agent for electrical installations. Electrical appliances which may be mentioned in particular are capacitors and transformers, especially capacitors which are built up from multi-layer paper and aluminum foil, from metallized paper, from a metallized plastic film, for example of polypropylene, polycarbonate or a polyterephthalate, or from a mixed dielectric, for example of paper, plastic film and aluminum foil or of metallized paper and plastic film.

The compositions according to the invention can in general be prepared by adding the components together.

The compositions according to the invention advantageously have a lower vapour pressure than do known dielectrics and therefore do not change their composition when subjected to heat. This is not the case, for example, with dielectrics which contain 2,6-di-tert.-butyl-4-methyl-phenol as the oxidation inhibitor. (German Offenlegungsschrift No. 2,823,758). As is known, 2,6-di-tert.-butyl-4-methyl-phenol has a considerable vapour pressure (VGB-Speisewassertagung (VGB Conference on Feed Water) 1971, page 12) and its content in the dielectric therefore changes on subjection to a heat treatment in vacuo.

The dielectrics according to the invention virtually do not decompose on subjection to heat. Thus, advantageously, virtually no acid scission products form on subjection to heat. The result of this is that virtually no corrosion is caused by the dielectrics according to the invention.

The oxidation inhibitor according to the invention advantageously displays good dielectric compatibility and better solubility in the other components of the composition. These mixtures have a lower loss factor, which does not change even when they are subjected to high temperatures and high electric loads.

The impregnated agent according to the invention has distinct advantages over the optionally stabilized monoisopropyl-diphenyls which have already been disclosed.

Thus, for example, the mixture according to the invention has a higher flash point and fire point. This can also clearly be seen in a test to determine the flammability.

When the compositions according to the invention are used, the addition of a hydrogen acceptor is superfluous, and this is advantageous.

The prerequisites for good dielectric properties of the capacitor are that both the solid dielectric and the liquid dielectric have been substantially freed from moisture. Drying of the liquid dielectric is as a rule effected by treatment with dried bleaching earths or other suitable adsorbents and/or by a vacuum treatment at elevated temperature in a de-gassing installation. When preparing the capacitor, it can arise that the pre-dried impregnating agent comes into contact with humid outside air after the impregnation has been carried out. It is therefore important that the impregnating agent used has advantageous hygroscopic characteristics.

If, for example, a mixture according to the invention and, for comparison, the mono-isopropyldiphenyl already disclosed are exposed in an open dish to the outside air (temperature 23° C., relative atmospheric humidity 50%, diameter of the dish 14 cm, volume 100 ml, time 24 hours) the mixture according to the invention absorbs about 20% less water.

The effectiveness of the stabilizer combination according to the invention was compared with that of the stabilizer systems already known in a life test on capacitors. It is found that the combination according to the invention, in capacitors, displays a lower failure rate in the life test. Moreover, the dielectric losses during this life test are considerably smaller in the case of the dielectric according to the invention than in the case of the systems which are already known.

EXAMPLE 1

Composition of an impregnating agent according to the invention

| | |
|---|---|
| m-Isopropyl-diphenyl | 25.4% by weight |
| p-Isopropyl-diphenyl | 19.5% by weight |
| Poly-isopropylated diphenyl | 54.4% by weight* |
| 2,2-Bis-(4-hydroxy-phenyl)-propane diglycidyl ether | 0.3% by weight |
| Di-tert.-amyl-hydroquinone | 0.3% by weight |

*consisting of 78% by weight if di-isopropylated diphenyls, 19% by weight of tri-isopropylated diphenyls and 3% by weight of tetra-isopropylated diphenyls.

EXAMPLE 2

Composition of an impregnating agent according to the invention

| | |
|---|---|
| m-Isopropyl-diphenyl | 33.6% by weight |
| p-Isopropyl-diphenyl | 22.5% by weight |
| Poly-isopropylated diphenyl | 43.3% by weight* |
| 2,2-Bis-(4-hydroxy-phenyl)-propane diglycidyl ether | 0.3% by weight |
| Di-tert.-amyl-hydroquinone | 0.3% by weight |

*consisting of 83% by weight of di-isopropylated diphenyls, 15% by weight of tri-isopropylated diphenyls and 2% by weight of tetra-isopropylated diphenyls.

EXAMPLE 3 (COMPARISON)

Composition of an impregnating agent which has already been disclosed (German Offenlegungsschrift 2,823,758)

| | |
|---|---|
| m-Isopropyl-diphenyl | 56.9% by weight |
| p-Isopropyl-diphenyl | 40.4% by weight |
| Di-isopropyldiphenyl | 2.0% by weight |
| β-Methyl-anthraquinone | 0.5% by weight |
| Di-tert.-butyl-4-cresol | 0.2% by weight |

EXAMPLE 4

Life test on capacitors impregnated with a dielectric according to the invention.

10 capacitors are filled with the dielectric according to Example 1 and 10 capacitors are filled with the dielectric according to Example 2. The capacitor dielectric consists of two layers of commercially available capacitor paper with a thickness of 10 μm and a density of 1.2 g/cm$^3$. The electrodes used are aluminum foils, which are arranged between 2 layers of capacitor paper in each case.

The capacitor raw sections (without casing) are dried at a temperature of 120° C. under a vacuum of $10^{-2}$ mm Hg for 8 hours. The impregnation is then carried out in vacuo at about 70° C. using the dielectric according to the invention (according to Example 1).

The impregnated capacitor sections are then sealed in an aluminum casing with casting resin and then subjected to the life test.

In the test, the capacitors are subjected at a temperature of 100° C. to an alternating voltage of 600 to 1,000 volts (field strength; 30 to 50 volts/μm). The field strength to which the capacitors are subjected is increased, from 30 volt/μm at the start, by 5 volt/μm every 250 hours throughout the entire test. The dielectric losses as a function of the field strength are determined both during the test and after the test. Even after the test, values are obtained for the loss factor which are identical to or better than the values prior to the test.

None of the capacitors has failed after a test time of 2,000 hours.

On the other hand, when this test was carried out with capacitors impregnated with the dielectric according to Example 3, 3 failures occurred after only 600 hours.

EXAMPLE 5

The physical constants of the compositions, according to the invention, according to Example 1 and 2 and, for comparison, of the composition according to Example 3 are listed in Table I. The corresponding test method is indicated in column 2.

The flammability was determined by the following method.

2 lines 300±3 mm apart are drawn with ink on a twilled glass fibre strip (breadth: 25 mm, thickness: 0.26 mm). The glass fiber strip is impregnated for 3 minutes with the sample and is then arranged horizontally on two holding rods. The ends of the glass fibre strip are weighted with weights. Two minutes after fastening the strip, the underside of the glass fibre strip is wiped off gently with a strip of gauze. The sample is ignited 50 mm before the right-hand line marked with ink on the glass fibre strip, using a Bunsen burner. The flame of the burner should be 20 to 50 mm high. Strong movements of air should be avoided during ignition. The combustion time is determined by measuring the time which the flame requires to advance from the line marked on the right-hand side to the line marked on the left-hand side, on the glass fibre strip.

TABLE I

Physical constants for dielectrics according to Example 1, 2 and 3

| | Test method | Dimensions | Example 1 | Example 2 | Example 3 (comparison example) |
|---|---|---|---|---|---|
| Colour | — | — | colourless | colourless | colourless |

TABLE I-continued

Physical constants for dielectrics according to Example 1, 2 and 3

|  | Test method | Dimensions | Example 1 | Example 2 | Example 3 (comparison example) |
|---|---|---|---|---|---|
| Refractive index at 20° C. | DIN 53491 | — | 1.5720 | 1.5809 | 1.5840 |
| Viscosity at 20° C. | DIN 51561 | $mm^2 \cdot s^{-1}$ | 17 | 12 | 9 |
| Density at 20° C. | ISO R 649 | | | | |
| | DIN 51757 | $kg \cdot m^{-3}$ | 970 | 981 | 985 |
| Shrinkage (from 100–20° C.) | calculated from density | % | 6 | 6 | 6 |
| Pour point | DIN 51583 | °C. | −49 | −54 | −54 |
| Flash point | DIN 51584 | °C. | 156 | 156 | 142 |
| Fire point | DIN 51584 | °C. | 166 | 166 | 156 |
| Water content | ISO R 760 DIN 51777 | ppm | >100 | >100 | >100 |
| Acid number | IEC DIN 53402 | $mg\ KOH \cdot g^{-1}$ | >0.01 | >0.01 | >0.02 |
| Relative permittivity ($\epsilon_r$) | IEC 250 | | | | |
| 50 Hz,500V at 20° C. | DIN 53483 | — | 2.6 | 2.7 | 2.6 |
| at 90° C. | | — | 2.4 | 2.5 | 2.3 |
| Loss factor (tan δ) | IEC 250 | | | | |
| 50 Hz,500V at 90° C. | DIN 53483 | — | 0.0001 | 0.0003 | 0.0001 |
| Volume resistivity ($p_D$) | IEC 247 | | | | |
| 1,000V, 1 minute at 90° C. | DIN 53482 | $G \cdot m$ | >1000 | >1000 | >1000 |
| Breakdown voltage ($U_d$) | IEC 156 | | | | |
| (from 20–90° C.) | DIN 53481 | kV | 80 | 80 | 80 |
| Flammability | | $mm \cdot s^{-1}$ | 6.9 | 7.0 | 8.6 |

What is claimed is:

1. A dielectric composition comprising a mixture of isopropylated diphenyls, said mixture containing 30 to 60 parts by weight of mono-isopropylated diphenyls and 70 to 40 parts by weight of poly-isopropylated diphenyls, said poly-isopropylated diphenyls comprising di-, tri- and tetra-isopropylated diphenyls, said poly-isopropylated diphenyls comprising 60 to 85 parts by weight of di-isopropylated diphenyls, 10 to 35 parts by weight of tri-isopropylated diphenyls and 0.5 to 5 parts by weight of tetra-isopropylated diphenyls, the amount of di, tri- and tetra-isopropylated diphenyls being based upon the total amount of poly-isopropylated diphenyls said mixture containing an epoxide and a hydroquinone derivative.

2. In an electrical apparatus containing a dielectric, the improvement wherein said dielectric is a dielectric according to claim 1.

3. A composition according to claim 1 containing 2,2-Bis-(4-hydroxyphenyl)-propane diglycidyl ether and di-tert.-amyl-hydroquinone.

4. A composition according to claim 1 comprising 0.05 to 2.0 parts by weight of said epoxide and 0.05 to 2.0 parts by weight of said hydroquinone derivative.

5. In an electrical apparatus containing a dielectric, the improvement wherein said dielectric is a dielectric according to claim 4.

* * * * *